Jan. 2, 1968     J. W. STROUD     3,361,031
MICROIMAGE VIEWER

Filed July 16, 1965     6 Sheets-Sheet 1

INVENTOR
JAMES W. STROUD
BY Darby & Darby
ATTORNEYS

Jan. 2, 1968  J. W. STROUD  3,361,031
MICROIMAGE VIEWER
Filed July 16, 1965  6 Sheets-Sheet 2
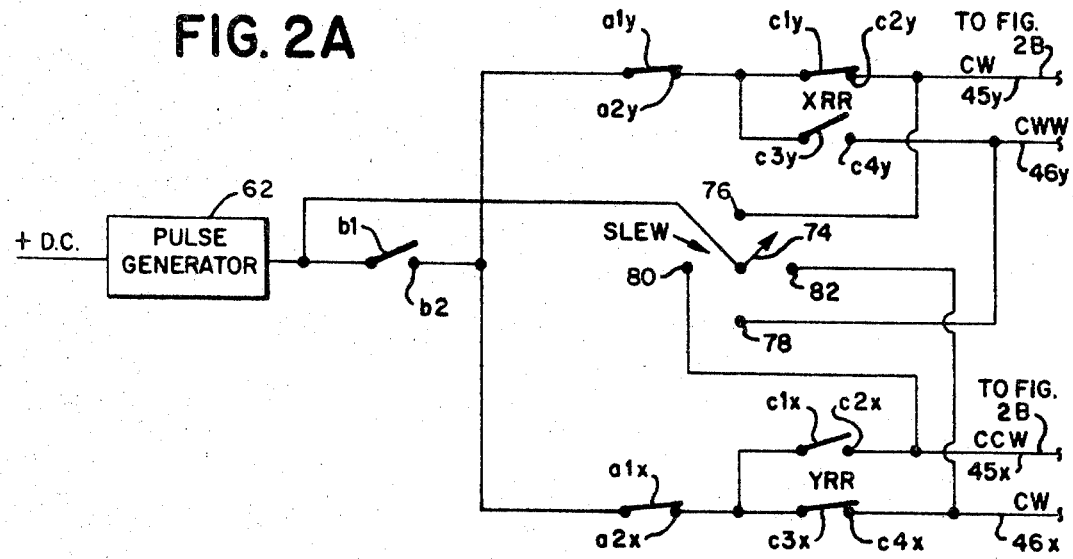
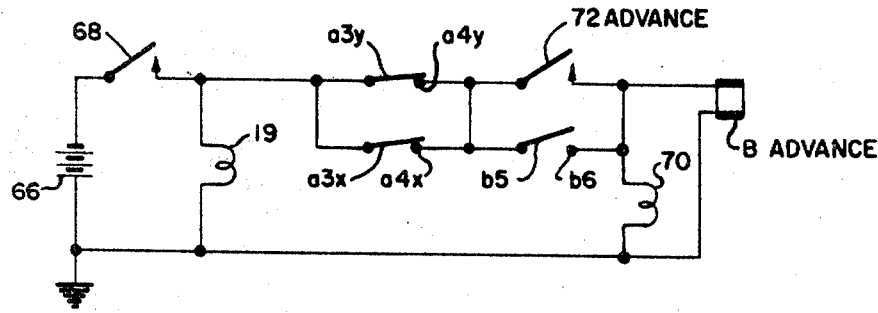
INVENTOR
JAMES W. STROUD
BY *Darley & Darley*
ATTORNEYS

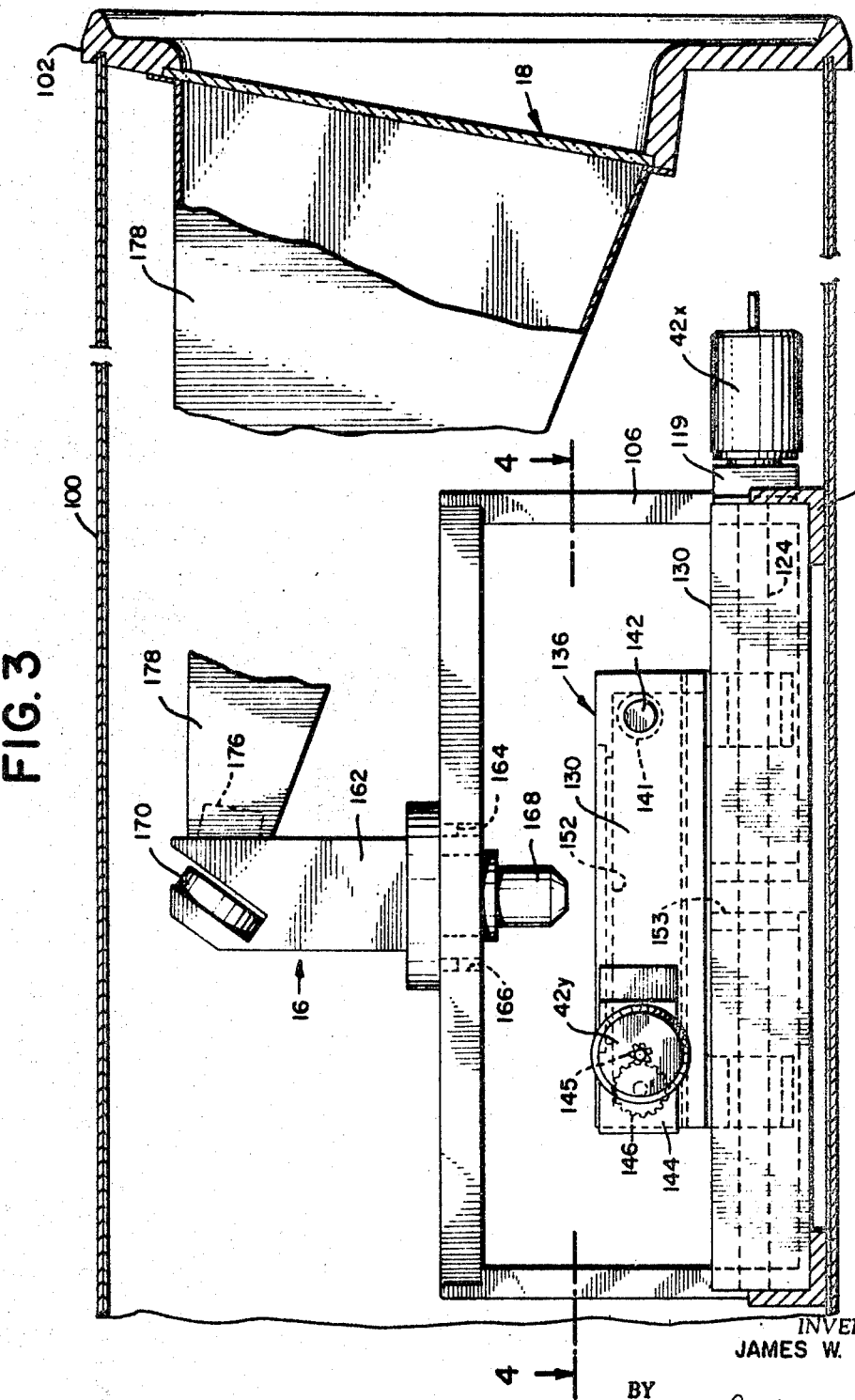

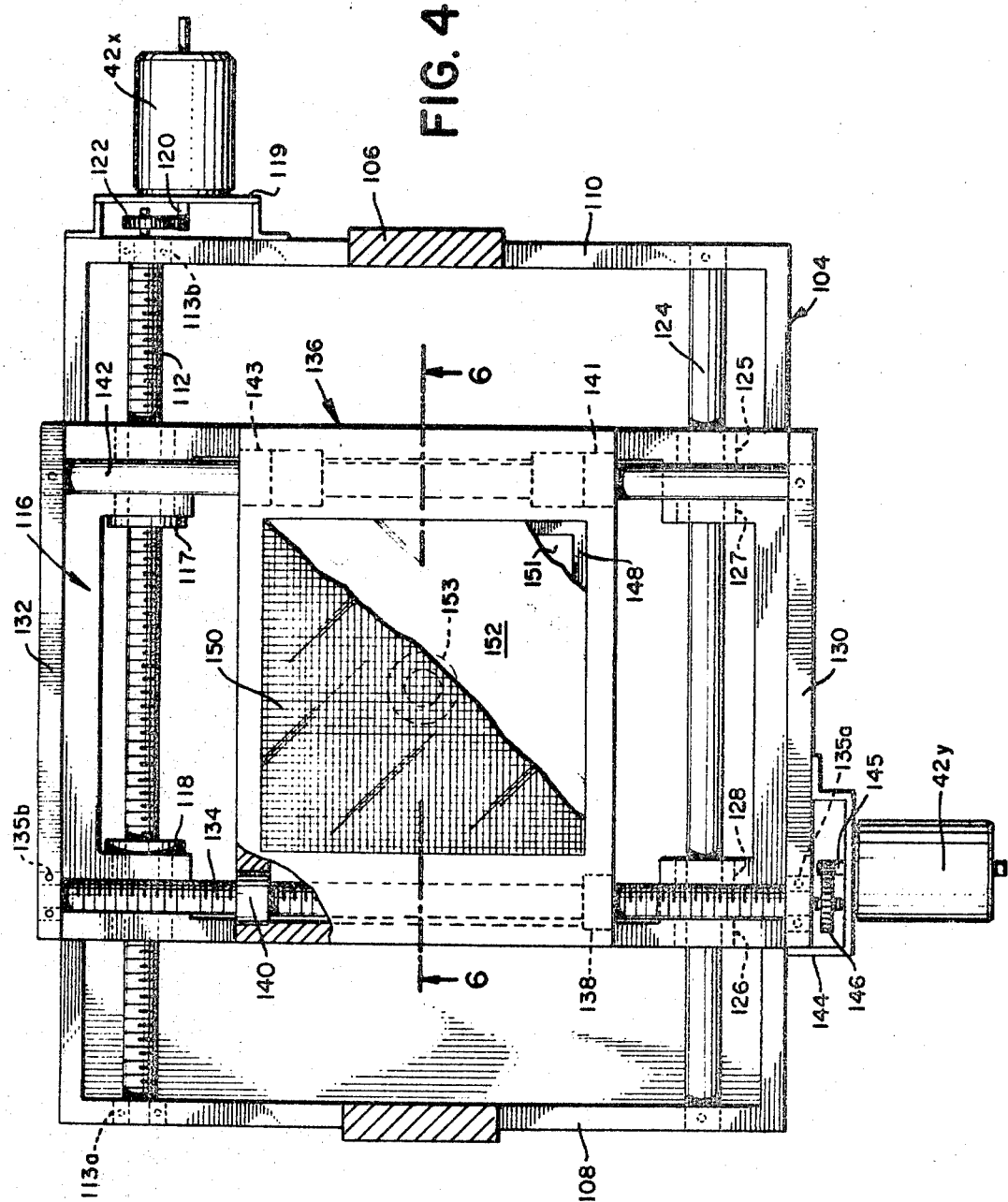

United States Patent Office 3,361,031
Patented Jan. 2, 1968

3,361,031
MICROIMAGE VIEWER
James W. Stroud, Bayshore, N.Y., assignor, by mesne assignments, to Fairchild Hiller Corporation, Hagerstown, Md., a corporation of Maryland
Filed July 16, 1965, Ser. No. 472,498
16 Claims. (Cl. 88—24)

ABSTRACT OF THE DISCLOSURE

A microimage viewer for use with a matrix of microimages wherein each image has an identifiable position with respect to X and Y axes, comprises a fixed optical readout means adapted to project a selected microimage against a screen mounted on the front of the unit, and X and Y positioning means for moving the matrix with respect to the projector along the X and Y axes. Each of the positioning means comprises a stepper motor and a plurality of rotary switches depending upon the number of digits of the microimage address. Certain of the rotary switches are connected directly to an address indicator and the others are connected mechanically to the outputs of the respective stepper motors with various sets of contacts connected together such that when a selected address coincides with the address of the image beneath the projector, movement of the matrix is terminated.

This invention pertains to microimage viewers, and, in particular, to a microimage viewer wherein random access is provided to any one of a plurality of stored microimages.

Microfilm images are conventionally stored in serial fashion on a roll of film, such that an image search can be conducted only in one dimension. This requires that the film preceding a selected image must be scanned prior to viewing that record. Consequently, a significant amount of time is wasted during the initial searching operation. Furthermore, when images are serially stored, it is not always possible to continuously scan a selected sequence of images. For example, with prior art constructions, a large flow diagram must be reduced to a plurality of images covering individual sectors of the diagram. When these images are serially stored, it normally is not possible to continuously trace a given line in the flow diagram through a number of such sectors unless the individual images covering the desired path of the flow diagram happen to be consecutively stored.

Accordingly, the main object of the present invention is to provide an automatic multidimensional random access microimage viewer or, in other words, a microimage viewer wherein a selected image having a multidimensional location within a storage medium can be acquired in a single addressing step.

Another object of the invention is to provide a microimage viewer which may be electronically or manually controlled to scan in any direction across a stored image.

Another object of the invention is to provide a microimage viewer which has the capability of acquiring data regarding the use of stored images. For example, such data may include the number of times a particular store was selected and the length of time that store was observed.

Yet another object of the invention is to provide a small, lightweight microimage viewer which is portable and which may be fully powered by an external source or by self-contained batteries.

The manner in which the above and other objects of the invention are accomplished is more fully described below with reference to the following drawings, wherein:

FIGURE 1 is a block diagram schematically illustrating the electrical, mechanical and optical elements of the invention;

FIGURES 2A, 2B and 2C comprise a circuit diagram, in partial schematic form, illustrating the electrical control circuits of the invention;

FIGURE 3 is a side view, partially in section, illustrating the construction which holds the microimage storage medium and positions such storage media along two axes;

FIGURE 4 is a view along the line 4—4 of FIGURE 3; and

Briefly, in accordance with the invention a plurality of individual microimages are stored in a coordinate system which is positionable along the respective axes with respect to an optical read-out. Each coordinate position is identified by corresponding addresses along the respective axes. When it is desired to view or read-out the microimage stored at a particular location, the address of that location is dialed into a viewer. An "ADVANCE" button is then actuated causing an electrical control circuit to position the coordinate system along the above mentioned axes so that the address of the microimage positioned beneath the optical read-out, corresponds to the address dialed into the reader. The selected microimage is then magnified and projected onto a viewing screen on the front panel of the viewer whereby the observer can view the selected microimage.

Figure 1:
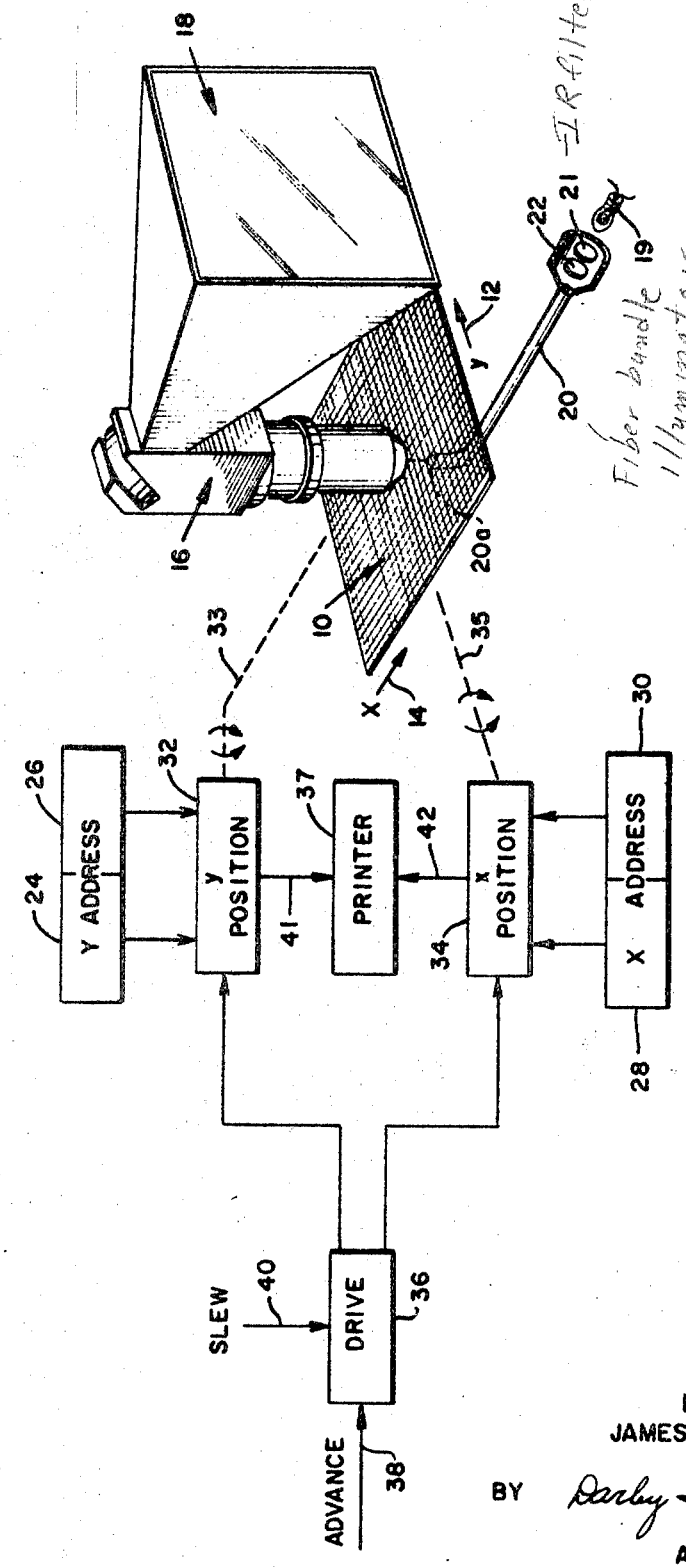

Referring to FIGURE 1, a typical two-dimensional matrix coordinate system is indicated generally at 10. By way of example, matrix 10 may consist of 9801 (99 x 99) individual microimages each approximately .026 inch square. Matrix 10 may be considered to have transverse Y and X axes indicated by the arrows 12 and 14, respectively.

An optical read-out structure 16 is positioned over the matrix 10 and adapted to read-out the microimage immediately adjacent to it in the optical path. The located image is magnified and projected by optical structure 16 against a screen 18 situated, for example, on the front panel of the viewer. A lamp 19 (e.g., fifty watts) provides the light required for the read-out of the selected image, and an optical train, such as a fiber optic bundle 20, transmits the light from lamp 19 to a point in the optical path of the lens of optical structure 16. The end 20a of bundle 20 is fire polished and brought as close as possible to the surface of the storage medium 10. The purpose of the fiber optic bundle 20 is to protect the image storage medium matrix 10 from the considerable heat produced by lamp 19, and a filter 21 removes the infrared from the light spectrum while a standard lens 22 condenses the light into the bundle 20. The structure so far described is illustrated and explained in detail with reference to FIGURES 3–5.

The coordinates of the individual images stored in matrix 10 are each identified by corresponding Y and X addresses. Since, in the present example, the matrix consists of 99 x 99 images, each image may be identified by two two-digit addresses corresponding to the respective axes. For this purpose, a pair of indicators 24 and 26 are provided to identify the desired image location along the Y axis, and a pair of corresponding indicators 28 and 30 to identify the X axis location. Indicators 24 and 28 correspond to the ten's position of the address and indicators 26 and 30 to the unit's position.

As shown schematically, indicators 24, 26 and 28, 30 are coupled to respective position control circuits 32 and 34. Position control circuits 32 and 34 include respective output shafts 33 and 35 which are rotatable in either clockwise or counter-clockwise directions depending upon signals applied to the corresponding position control circuit by a drive circuit 36 as explained below. Rotation of shafts 33 and 35 causes movement of matrix 10 along the Y and X axes, respectively, so that any desired image may be located immediately beneath the optical read-out structure 16. Drive circuit 36 is rendered operative by an "ADVANCE" signal on line 38 and may be manually controlled or slewed by the presence of a signal on line 40 as explained in detail below.

In operation, the Y and X addresses (i.e., coordinates) of the image which it is desired to view are dialed into respective indicators 24, 26 and 28, 30. An "ADVANCE" signal is applied to line 38 causing drive circuit 36 to operate the Y and X position control circuits 32 and 34 rotating shafts 33 and 35 clockwise or counter-clockwise. Simultaneously lamp 19 is energized to enable read-out of the selected image. The rotation of shafts 33 and 35 positions matrix 10 along the Y and X axes 12 and 14 until such time as the address of the image in the optical path of the read-out structure 16 coincides with the address dialed into the indicators 24, 26 and 28, 30. When coincidence along one axis occurs, the corresponding position control means is deenergized causing further rotation of its output shaft to cease. When both the Y and X addresses have been located, the matrix 10 remains stationary with the desired image in position for read-out. As explained in detail below, the position control circuits 32 and 34 are able to reverse the rotation of their respective output shafts if required by the image search instruction.

A conventional printer 37 is responsive to signals from position control means 32 and 34 via lines 41 and 42, respectively, when the addresses of the selected image has been dialed into indicators 24, 26 and 28, 30 and the "ADVANCE" button energized. Printer 37 records the X and Y addresses of the selected image and the elapsed time since the previous image selection. Information of this nature is valuable as a statistical aid indicating the use of the various stored images, and various known devices may be used for this purpose.

Figure 2B:
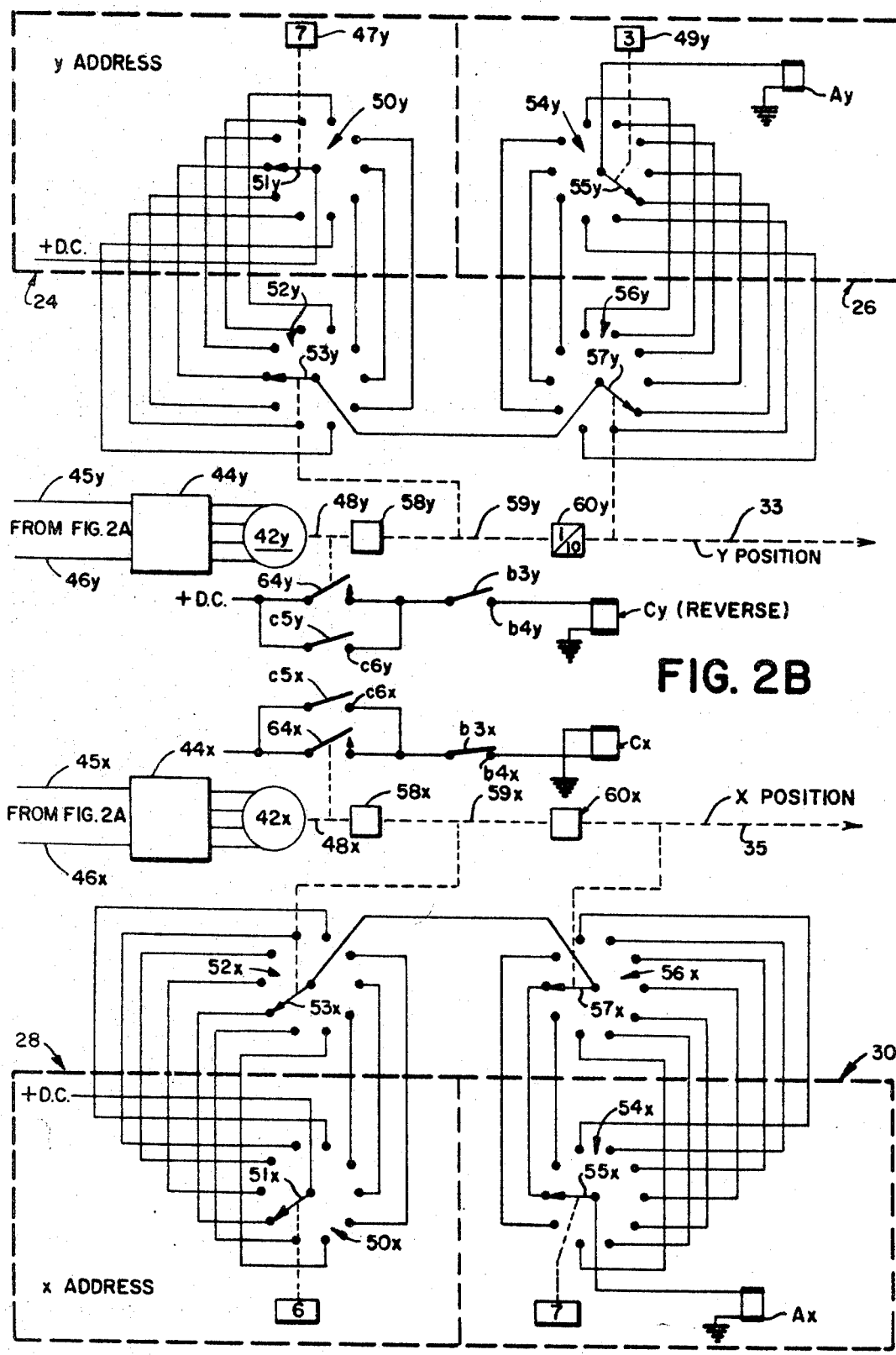

FIGURES 2A, 2B and 2C comprise a circuit diagram of the control circuitry shown in FIGURE 1. The control circuitry in the illustrated embodiment utilizes relays which are designated by capital letters with the contacts of such relays being designated by the corresponding lower case letter and a subsequent numeral. The relay contacts are illustrated in their de-energized condition. Since the Y position control circuit 32 and the X position control circuit 34 are identical, the parts thereof are identified by the same call-out numeral followed by a lower case $y$ or $x$, respectively. Although only the Y position control 32 is herein described, it is to be understood that those parts designated with the corresponding numerals in the X position control circuit 34 behave in the identical fashion.

The actual positioning device consists of a stepper motor $42y$ (FIG. 2B) which is operated by a motor controller $44y$. Since such parts are well known they have been illustrated schematically. By way of example, the stepper motor and motor controller may be of the type manufactured by IMC Magnetics of Westbury, N.Y., U.S.A., and sold under the part numbers 020-004 and 1907202, respectively. Motor controller $44y$ in response to a pulse on line $45y$ causes motor $42y$ to rotate its output shaft $48y$ fifteen degrees in a clockwise direction; in response to a voltage on line $46y$ the motor controller $44y$ will cause motor $42y$ to rotate shaft $48y$ in a counter-clockwise direction.

The Y address indicator 24, 26 includes a tens indicator $47y$ and a unit indicator $49y$ which can be conventional dials adjustable by the user to any one of the ten digit positions. Two ten position rotary switches $50y$ and $52y$ have armatures $51y$ and $53y$, respectively, are associated with the tens position of the address, with similar switches $54y$ and $56y$, having armatures $55y$ and $57y$, corresponding to the units position. As shown by dotted lines, indicators $47y$ and $49y$ are mechanically coupled to armatures $51y$ and $55y$ whereby the switches $56y$ and $52y$ are "set" as a function of the address dialed into indicators $47y$ and $49y$, respectively. Each of the rotary armatures $51y$, $53y$, $55y$ and $57y$ is adapted to make electrical contact with one of ten stationary terminals (not numbered). As illustrated, the corresponding stationary terminals of switches $50y$ and $52y$ are electrically connected, and the corresponding terminals of switches $54y$ and $56y$ are electrically connected. A source of direct voltage is applied to armature $51y$; armatures $53y$ and $57y$ are electrically connected; and a stop relay $Ay$ is connected between armature $55y$ and ground. Operation of the circuit is described below.

The output shaft $48y$ of motor $42y$ may be coupled through gears $58y$ to alter the speed of rotation of shaft $59y$ with respect to shaft $48y$ if it is desirable. Shaft $59y$ is mechanically coupled to armature $53y$ thus stepping armature $53y$ sequentially into contact with its associated stationary terminals. Shaft $59y$ is also coupled through gears $60y$ to output shaft 33 so that the speed of rotation of shaft 33 is ten times that of shaft $59y$. Shaft 33 is mechanically coupled to armature $57y$ whereby armature $57y$ is stepped at a rate of speed ten times that of armature $53y$. This movement controls the shaft encoder. More encoders may be added as needed.

The stepper motor $42y$ is controlled by a pulse generator 62 (FIGURE 2A) which, upon closure of the relay contacts $b1$ and $b2$, applies a pulse train to the clockwise lead $45y$ through normally closed relay contacts $a1y$, $a2y$ and $c1y$, $c2y$.

The output shaft $48y$ of stepper motor $42y$ is coupled in a conventional manner to a limit switch $64y$ whereby switch $64y$ is actuated each time matrix 10 has moved as far as it can along the Y axis. During movement of the matrix, contacts $b3y$ and $b4y$ are closed so that closure of switch $64y$ energizes reverse relay $Cy$. Energization of relay $Cy$ simultaneously opens contacts $c1y$, $c2y$ and closes contacts $c3y$, $c4y$ causing motor controller $44y$ to operate motor $42y$ such that shaft $48y$ rotates in a counter-clockwise direction. At the same time, closure of contacts $c5y$ and $c6y$ completes a holding circuit to the reverse relay $Cy$.

The operation of the circuit will now be described with further reference to a specific example. Thus, assume that it is desired to locate the image at the Y axis address "seventy three" and the X axis address "sixty seven." Although the position control circuits are shown as they would exist at the time that image is located, the circuit will not normally be in that condition.

To turn on the device, power switch 68 (FIGURE 2C) is closed applying the voltage of power supply 66 across the lamp 19. The user then dials the numbers "seven" and "three" into indicators $47y$ and $49y$ (FIGURE 2B), respectively, and the numbers "six" and "seven" into respective indicators $47x$ and $49x$. By this act the armatures $51y$, $55y$ and $51x$, $55x$ are set to their illustrated positions. The user then depresses the "ADVANCE" switch 72 which applies the voltage potential across the "AD- VANCE" light 70 and relay B through the normally closed contacts a3y, a4y (and a3x, a4x). A holding circuit is further completed through contacts b5, b6 so that the actuating force may be removed from "ADVANCE" switch 72.

Energization of "ADVANCE" relay B closes contacts b1, b2 applying the pulses from pulse generator 62 through normally closed contacts a1y and c1y to the clockwise control lead 45y of motor controller 44y. Motor 42y then rotates shaft 48y in a clockwise direction consequently stepping armatures 53y and 57y as explained above. When armatures 53y and 57y reach their illustrated positions (i.e., corresponding to the digits set into indicators 47y and 49y respectively), a circuit is completed to "stop" relay Ay from the DC potential on armature 51y through the seventh position stationary terminals on switches 50y and 52y, armature 53y, armature 57y, and the third stationary terminals of switches 54y and 56y.

When relay Ay is energized, contacts a1y and a2y open, removing the control voltage from motor controller 44y, and motor 42y is therefore inhibited from further operation. In the identical fashion when armatures 53x and 57x are stepped to the sixth and seventh stationary terminals of their respective switches, relay contacts a1x and a2x open preventing further operation of motor 42x. At that time, the desired image will be located in the optical path of the optical read-out 16 (see FIGURE 1), and the magnified image will be projected onto screen 18 as described in greater detail below.

In the event that the addressed image is located in a matrix position with a smaller X or Y coordinate value than the previous image, closure of limit switch 64y will energize reverse relay Cy switching the controls of motor controller 44y as explained above whereby armatures 53y and 57y will be stepped in a reverse direction until the proper stationary terminals of the various switches have been located.

The slew control described briefly above is a valuable feature of the invention and includes a switch having armature 74 (FIG. 2A) movable to four stationary terminals 76, 78, 80 and 82. Terminals 76 and 78 are connected to controller leads 45y and 46y respectively; terminals 80 and 82 are connected to controller leads 45x and 46x respectively. Armature 74 is directly connected to the output of pulse generator 62 thereby by-passing (when operated) all of the control circuits of relays Ay, Ax, B, Cy and Cx. Thus, when the power switch 68 is closed, movement of armature 74 to any one of its stationary terminals will drive motors 42y or 42x in a corresponding direction whereby matrix 10 can be positioned with any point thereon prepared for read-out. This feature is particularly desirable in the case of extremely large flow diagrams some of which, even in the case of the reduction herein involved, may be reduced to the size of the overall matrix. If it is desired to follow a single line throughout this entire diagram, this may be easily accomplished by the use of the slew switch regardless of the direction in which the line should extend.

Figure 6:
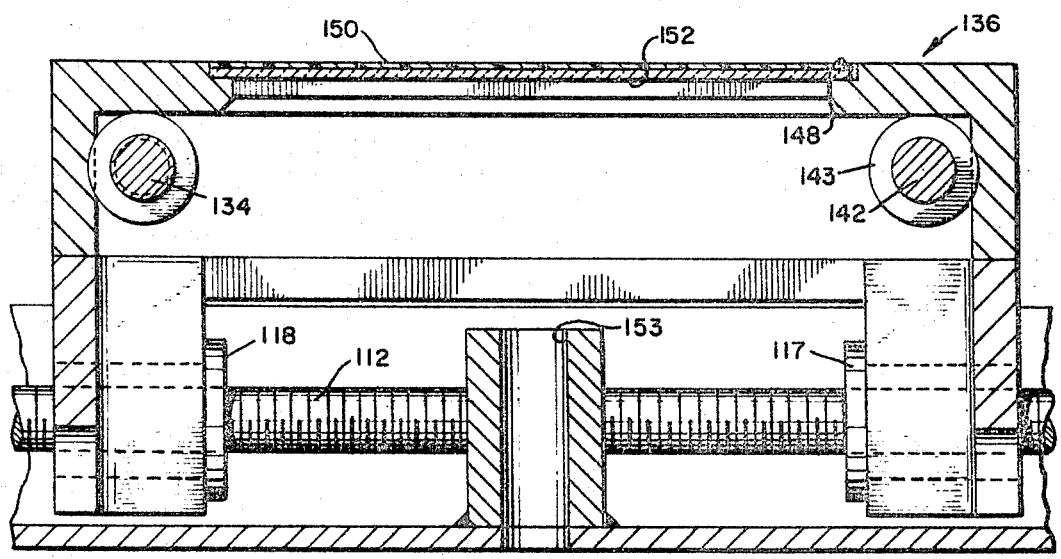
FIGURE 6 is a view along line 1—1 of FIGURE 3.

It will be obvious to those skilled in the art that numerous mechanical configurations can be used to practice the invention. FIGURES 3, 4 and 6 illustrate a preferred construction, much of which is known, for suitably positioning the matrix with respect to the optical read-out 16. Moreover, since parts of the structure are known, all of the specific mechanical details are not shown. Also not illustrated are the circuit components, the light source 19 and the fiber optic bundle 22, the placement and design of which will be obvious to those skilled in the art.

It is anticipated that the invention will have widespread appeal, and for this reason it may be enclosed in a casing 100 (FIGURE 3) of attractive appearance and covered at its front end by a plastic face plate 102 suitably shaped to receive the screen 18. Screen 18 will be of a size permitting easy reading of the reproduced image, and, of course, may vary depending upon the nature of the stored images. A rectangular frame 104 is fixed to the bottom of casing 100 with a U-shaped superstructure 106 secured to two opposing walls 108 and 110 of the base 104. Superstructure 106 supports the optical read-out structure 16 as explained in greater detail below with reference to FIGURE 5.

An X drive screw 112 (FIGURE 4) is suitably journalled in bushings 113a and 113b which are press fit in the opposing base walls 108 and 110. An X table 116 is positioned above the upper edges of the base 104 and includes downwardly extending members (not numbered) into which threaded nuts 117 and 118 are press fit so as to engage the drive screw 112.

The motor 42x is suitably secured to wall 110 by means of a bracket 119, and the output gear 120 of motor 42x drives the X screw 112 through a reduction gear 122. Because the construction may be conventional, the specific gearing arrangement between the motor 42x and the respective switches 52x and 56x of the circuit shown in FIGURE 2B are not illustrated.

A round guide bar 124 is secured in walls 108 and 110 opposite the X drive screw 112. Guide bar 124 extends through apertures in annular bearings 125 and 126 which are press fit in downwardly depending ears 127 and 128, respectively, of X table 116.

The X table 116 includes upstanding end walls 130 and 132 and a Y drives screw 134 is suitably journalled in bushings 135a and 135b, supported in walls 130 and 132. The Y table is shown generally at 136 positioned above the X table 116, and includes downwardly depending legs (not numbered) which contain threaded nuts 138 and 140 in engagement with the Y drive screw 134. A round guide bar 142 is also secured in the Y table walls 130 and 132 and passes through suitable apertures in press fit bearings 141 and 143 of Y table 136.

Motor 42y is secured to wall 130 by means of a U-shaped bracket 144 and drives the Y drive screw 134 through output gears 145 and 146. Again, the specific gearing interconnection between the motor 42y and the rotary switches 52y and 54y have not been illustrated since the specific construction for this purpose would be obvious to those skilled in the art.

The center portion of the Y table 136 includes a square cutout portion enveloped by an indented rim 148. The image storage medium shown at 150 fits on top of a transparent supporting backing 151 within rim 148 and is covered by a second transparent plate 152 to protect the stored images. The fiber optic bundle 22 (not shown in FIGURES 3–5) is introduced into the immediate vicinity of the image storage medium through a pipe 153 which extends upwardly from the base 104. The fiber optic bundle 20 (not illustrated in FIGURES 3–5) should extend beyond the frame 104 to a convenient location within casing 100 where the lamp 19 may also be located.

Figure 5:
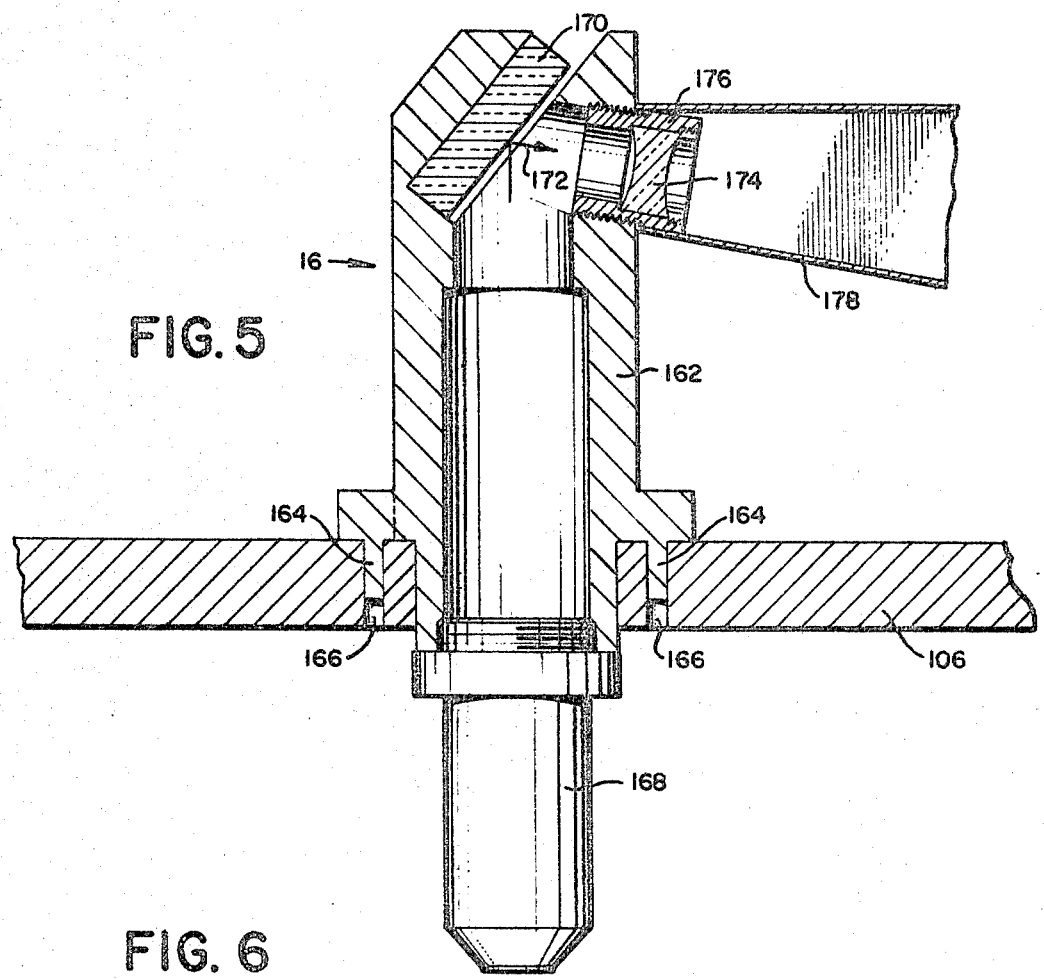
FIGURE 5 is a view along the line 6—6 of FIGURE 6 showing a preferred embodiment of the apparatus used to read out the selected image.

The optical read-out structure 16 is shown in detail in FIGURE 5 and comprises a rectangular housing 162 having downwardly depending studs 164 which may be received in suitable apertures 166 of the superstructure 106 for support purposes. A commercially available magnifying lens structure 168 is mounted on the lower extremity of the housing 162. By way of example, the lens structure 168 may be an objective lens with its lower extremity positioned 6.5 millimeters above the image storage medium, and may provide a magnification of 10 times the microimage 150.

At least one mirror 170 is mounted so as to reflect the image (as shown by arrow 172) from storage medium 150 and objective lens 168 through a projection lens 174 which may be retained in a lens mount 176 with the projection space between lens 174 and screen 18 being shrouded by a hood 178. Lens 174 has sufficient magnification to fill the screen 18. For example, the magnification power of projection lens 174 could be twenty-five times, so that the product of the twenty-five times magnification and the ten times magnification of the objective lens 168 will equal a total of two hundred fifty times magnification of the original image on medium 150. Hence, if the original microimage is .026 inch by .026 inch, the projected image on the screen will be 6.50 inches per side which may, depending on the distance of the screen from the projection lens 174, correspond to the dimensions of the screen.

The invention has been described for use in viewing a microimage which is stored in a two-dimensional coordinate system. However, the invention is not so limited. For example, the coordinate system could be formed as a cylinder, or a portion thereof, which could be rotated and moved axially with respect to the optical read-out to locate a desired image. Such a construction would have the advantage of requiring reduced space, but might introduce problems in read-out as the microimage storage medium is rotated. Because of the magnification involved, normally insignificant changes in the radius of such a cylinder might affect the focusing of the images as they are rotated. Various other modifications of the invention will also be obvious to those skilled in the art, and, accordingly, the invention should not be limited except as defined by the following claims.

What is claimed is:

1. A microimage viewer for use with a matrix of microimages, each of said images having identifying first and second axis coordinates, comprising
   optical readout means for magnifying and projecting a selected microimage, and
   first and second means for positioning said matrix along respective axes with respect to said optical readout means, said first and second positioning means each comprising
   (a) motor means for moving said matrix with respect to one of said axes,
   (b) first switch means having a plurality of first contacts,
   (c) voltage applying means for energizing one of said first contacts depending upon the coordinate position of a selected microimage with respect to said one axis, the voltage applying means of each of said positioning means being operable independently of each other,
   (d) second switch means having a plurality of second contacts and at least one additional contact,
   (e) means for providing relative movement between said second contacts and said additional contact so as to cause said additional contact to electrically engage one of said second contacts depending upon the position of said matrix with respect to said optical readout means along said one axis,
   (f) means for electrically connecting at least some of said first contacts to respective ones of said second contacts, and
   (g) means for inhibiting movement of said matrix by said motor means when said additional contact is electrically contacting the second contact corresponding to the first contact energized by said voltage applying means.

2. A microimage viewer according to claim 1, wherein each of said positioning means further comprises,
   at least two of said first switch means,
   at least two of said second switch means, the first contacts of each of said first switch means being connected to respective second contacts of the respective second switch means.

3. A microimage viewer according to claim 2, wherein, in each of said positioning means,
   said additional contacts are electrically connected together,
   said voltage applying means is adapted to be connected to a first contact of one of said first switch means, the other of said first switch means includes a common contact member adapted to electrically contact a selected first contact of said other first switch means, and
   said inhibiting means is connected to said common contact member.

4. A microimage viewer according to claim 3, wherein each of said switch means comprises a rotary switch having a plurality of stationary contacts and a rotary armature.

5. A microimage viewer according to claim 4, wherein the rotary armatures of each of said second switch means are mechanically coupled to the outputs of their associated motor means, and wherein each of said positioning means includes
   means for rotating the armatures of its second switch means at different rates.

6. A microimage viewer according to claim 5, wherein the rotary armatures of said first switch means are manually settable and including,
   means for indicating the position at which each of said last named rotary armatures has been set.

7. A microimage viewer according to claim 6, wherein each of said positioning means includes
   means responsive to the position of the matrix with respect to an associated axis for reversing the direction of rotation of the motor means associated therewith.

8. A microimage viewer according to claim 7, wherein each of said motor means comprises
   a reversible stepper motor adapted to rotate an output shaft in discrete increments, and
   motor controller means having at least two inputs for controlling the direction of rotation of said output shaft depending upon which of said two inputs is energized.

9. A microimage viewer according to claim 8, including pulse generator means, and
   switch means for connecting the output of said pulse generator means to one input of each of said motor controlling means.

10. A microimage viewer according to claim 9, including
    slew switch means connected between said pulse generator and motor controller means and adapted to couple pulses from said pulse generator means directly to any selected one of the input lines of both said motor controller means.

11. A microimage viewer according to claim 1, wherein each of said switch means comprises a rotary switch having a plurality of stationary contacts and a rotary armature, the rotary armatures of each of said second switch means being mechanically coupled to the outputs of their associated motor means.

12. A microimage viewer according to claim 11, wherein the rotary armatures of said first switch means are manually settable and including,
    means for indicating the position at which each of said last named rotary armatures has been set.

13. A microimage viewer according to claim 12, wherein each of said positioning means includes
    means responsive to the position of the matrix with respect to an associated axis for reversing the direction of rotation of the motor means associated therewith.

14. A microimage viewer according to claim 1, wherein each of said motor means comprises
    a reversible stepper motor adapted to rotate an output shaft in discrete increments, and
    motor controller means having at least two inputs for controlling the direction of rotation of said output shaft depending upon which of said two inputs is energized.

15. A microimage viewer according to claim 14, including
    pulse generator means, and switch means for connecting the output of said pulse generator means to one input of each of said motor controlling means.

16. A microimage viewer according to claim 15, including
slew switch means connected between said pulse generator and motor controller means and adapted to couple pulses from said pulse generator means directly to any selected one of the input lines of both said motor controller means.

References Cited

UNITED STATES PATENTS

| | | | |
|---|---|---|---|
| 3,010,376 | 11/1961 | Johnson | 88—26 |
| 3,016,785 | 1/1962 | Kapany | 240—1 |
| 3,068,739 | 12/1962 | Hicks, et al. | 240—1 |
| 3,267,801 | 8/1966 | Abbott, et al. | 88—24 |

NORTON ANSHER, *Primary Examiner.*

RICHARD M. SHEER, *Assistant Examiner.*

UNITED STATES PATENT OFFICE
CERTIFICATE OF CORRECTION

Patent No. 3,361,031                      January 2, 1968

James W. Stroud

It is certified that error appears in the above identified patent and that said Letters Patent are hereby corrected as shown below:

In the drawings, Sheet 2, FIG. 2A, above the voltage line 46y, "CWW" should read -- CCW --. Column 4, line 13, "have" should read -- having --; line 18, "switches 56y and 52y" should read -- switches 50y and 54y --. Column 6, line 26, "drives" should read -- drive --; line 39, "54y" should read -- 56y --.

Signed and sealed this 29th day of July 1969.

(SEAL)
Attest:

Edward M. Fletcher, Jr.                      WILLIAM E. SCHUYLER, JR.

Attesting Officer                              Commissioner of Patents